(12) United States Patent
Meeks et al.

(10) Patent No.: US 12,479,538 B2
(45) Date of Patent: Nov. 25, 2025

(54) HDPE MARINE BOOM WITH AXIAL PASSAGE AND CHAIN STOP

(71) Applicant: WORTHINGTON PRODUCTS INCORPORATED, East Canton, OH (US)

(72) Inventors: Paul S. Meeks, East Canton, OH (US); Marc Schneider, East Canton, OH (US); Jon Garver, East Canton, OH (US)

(73) Assignee: WORTHINGTON PRODUCTS INCORPORATED, East Canton, OH (US)

( * ) Notice: Subject to any disclaimer, the term of this patent is extended or adjusted under 35 U.S.C. 154(b) by 0 days.

(21) Appl. No.: 18/729,375

(22) PCT Filed: Feb. 23, 2022

(86) PCT No.: PCT/US2022/017451
§ 371 (c)(1),
(2) Date: Jul. 16, 2024

(87) PCT Pub. No.: WO2023/146559
PCT Pub. Date: Aug. 3, 2023

(65) Prior Publication Data
US 2025/0003165 A1 Jan. 2, 2025

Related U.S. Application Data

(60) Provisional application No. 63/303,224, filed on Jan. 26, 2022, provisional application No. 63/303,220, (Continued)

(51) Int. Cl.
*B63B 22/04* (2006.01)
*B63B 5/24* (2006.01)
(Continued)

(52) U.S. Cl.
CPC ............... *B63B 22/04* (2013.01); *B63B 5/24* (2013.01); *B63B 22/16* (2013.01); *E02B 15/085* (2013.01);
(Continued)

(58) Field of Classification Search
CPC .......... B63B 20/04; B63B 22/16; B63B 5/24; B63B 2005/242; E02B 15/085
See application file for complete search history.

(56) References Cited

U.S. PATENT DOCUMENTS

| 1,201,863 A | 10/1916 | Orey |
| 2,228,529 A | 1/1941 | Moeller |

(Continued)

OTHER PUBLICATIONS

International Search Report filed in corresponding PCT Application No. PCT/US22/17451 dated Jun. 14, 2022; 4 pages.
(Continued)

*Primary Examiner* — Kyle Armstrong
(74) *Attorney, Agent, or Firm* — Black McCuskey

(57) ABSTRACT

A marine boom system includes at least one HDPE marine boom with an axial passage for mounting on a chain and a chain stop. The boom includes a shell defining a cavity with watertight caps having central apertures on the ends. An axial passageway pipe is disposed longitudinally along a center axis, and extends through the apertures and beyond the ends of the shell. A floatation billet is disposed within the shell. A chain is disposed in the axial passageway pipe and extends beyond the ends of the axial passageway pipe. The stop including at least one assembly piece may be fastened to the chain and disposed within an end of the pipe. The assembly piece includes a semi-cylindrical main body with passageway formed therein and has a protrusion about one passageway and a recess about another. A flange and a link saddle extend from the main body.

14 Claims, 10 Drawing Sheets

Related U.S. Application Data filed on Jan. 26, 2022, provisional application No. 63/303,232, filed on Jan. 26, 2022, provisional application No. 63/303,217, filed on Jan. 26, 2022, provisional application No. 63/303,259, filed on Jan. 26, 2022.

(51) Int. Cl.
*B63B 22/16* (2006.01)
*E02B 15/08* (2006.01)

(52) U.S. Cl.
CPC ....... *B63B 2207/00* (2013.01); *B63B 2231/40* (2013.01)

(56) References Cited

U.S. PATENT DOCUMENTS

| | | | |
|---|---|---|---|
| 3,482,393 A | 12/1969 | Marshall | |
| 3,685,297 A | 8/1972 | Juodis | |
| 5,439,315 A | 8/1995 | MacKenzie | |
| 7,086,421 B2 | 8/2006 | Backman | |
| 7,140,599 B1 * | 11/2006 | Spink | E02B 15/085 405/71 |
| 11,814,143 B2 * | 11/2023 | Smith | E02D 5/223 |
| 2004/0266287 A1 * | 12/2004 | Hampton | E02B 15/08 405/63 |
| 2018/0072508 A1 | 3/2018 | Brown, Sr. | |

OTHER PUBLICATIONS

Written Opinion filed in corresponding PCT Application No. PCT/US22/17451 dated Jun. 14, 2022; 6 pages.

International Preliminary Report on Patentability filed in the corresponding PCT Application dated Jul. 30, 2024; 8 pages.

* cited by examiner

HDPE MARINE BOOM WITH AXIAL PASSAGE AND CHAIN STOP

CROSS-REFERENCE TO RELATED APPLICATIONS

This application claims priority to and the benefit of U.S. Provisional Patent Applications Nos. 63/303,217, 63/303,220, 63/303,224, 63/303,232, and 63/303,259, all filed on Jan. 26, 2022, the contents of which are hereby incorporated by reference in their entirety.

BACKGROUND

This relates in general to marine barriers such as marine booms.

Marine booms are often utilized to form certain types of waterway barrier. For example, some marine booms are used to form containment barriers. Some marine booms are used to form navigational barriers. Generally, these waterway barrier systems include a number of buoyant marine boom bodies that float at or about the water's surface and are connected together.

SUMMARY

This relates more particularly to marine boom system including an HDPE marine boom with an axial passage for mounting on a chain and a chain stop.

A High-Density Polyethylene (HDPE) marine boom system includes at least one marine boom having an elongated generally cylindrical shell defining a cavity. The shell has first and second ends. First and second caps are disposed about the first and second ends respectively. Each cap includes a generally cylindrical main body having an outer diameter and an inner diameter equal to an outer diameter and an inner diameter of the shell, and an end wall extending across one end of the main body including a centrally located circular aperture, where the other end of the main body of each of the first and second caps are axially aligned with the first and second ends of shell respectively and joined together forming a watertight seal. An axial passageway pipe having a generally cylindrical main body is disposed longitudinally along and aligned with a center axis of the shell, and has first and second ends extending beyond the first and second ends of the shell respectively and through the circular apertures in the end walls of the first and second caps and beyond an end face of the end walls, where respective ends of the axial passageway pipe are welded to respective end walls of each of the first and second caps at an interface of an outer circumference of the axial passageway pipe main body and the apertures in the end wall of the first and second caps and forming a watertight seal. A floatation billet is disposed within the cavity in the shell, where the flotation billet is coaxially disposed between axial passageway pipe and the shell. A chain consisting of a plurality of chain links is disposed in the axial passageway pipe and extends beyond the ends of the axial passageway pipe.

The marine boom may further include at least one baffle disc extending radially between the axial passageway pipe and an inner surface of the shell, and for a plurality of discs they may be longitudinally spaced therein, to provide structural support between the axial passageway pipe and the shell. The baffle disc(s) may be formed from a ridged thermoplastic.

The billet may include at least two billet pieces placed on the axial passageway pipe and disposed on opposite sides of the baffle disc.

Respective ends of the axial passageway pipe may be heat welded to the end walls of the end caps about the cap apertures forming weld bead.

The shell may include an inner layer and an outer layer, where the inner layer and outer layer are formed from HDPE with the same formulation, with the inner layer further includes at least 2% carbon black by mass and the outer layer does not include carbon black and the outer layer further including a colorant with ultraviolet stabilizers and the inner layer does not include the colorant, where the inner layer and outer layer have been coextruded to form a unitary body.

A graphic may be formed on a piece of polymer film and fused to the shell by flame treating the polymer film and the outer layer of the shell until each at least partially liquefies and then are allowed to cure together.

The end caps may be formed from the same material as the outer layer and the axial passageway pipe may be formed from the same material as the inner layer.

The HDPE marine boom system may further include a chain stop. The chain stop includes first and second assembly pieces, each having at least one semi-cylindrical main body defining a central axis, a main semi-circumference, a main outer diameter, and a main inner diameter. The assembly piece also has first and second planar ends spaced apart by a thickness. The assembly piece also has a main exterior surface extending about the semi-circumference between the first and second planar ends. The assembly piece also has first and second interior radial surfaces extending between the first and second planar ends and the main inner and main outer diameter. First and second stop passageways are formed between the main exterior surface and the first and second interior radial surfaces respectfully. The first and second stop passageways are co-disposed in a radial plane of the semi-cylindrical main body. The main body has a protrusion extending from the first radial surface about the first stop passageway, and has a recess formed in the second radial surface about the second stop passageway complementary to the protrusion. The protrusion and the recess are spaced an equal radial distance from the axis. A semi-cylindrical flange extends coaxially from the second end of the semi-cylindrical main body. The semi-cylindrical flange has a flange interior surface coincident with the main inner diameter, and has a flange exterior surface disposed between the main inner diameter and the main outer diameter. A link saddle extends from the main body, and is disposed across the inner diameter, and defines link beds for receiving portions of a link of chain. The semi-cylindrical flanges of the first and second chain stops are disposed in respective ends of the axial passageway pipe, each having one of the plurality of chain links disposed within the assembly in the semi-cylindrical flange and between the link saddles of the first and second piece.

The semi-cylindrical main body, the semi-cylindrical flange, and the link saddle, of each of the first and second assembly pieces, may be monolithically formed.

The HDPE marine boom system may further include a first bolt extending through the first stop passageway of the first assembly piece and the second stop passageway of the second assembly piece, and a second bolt extending through the second stop passageway of the first assembly piece and the first stop passageway of the second assembly piece, and securing the first and second assembly pieces together.

The first and second assembly pieces may each include a third stop passageway disposed in the link saddle and the semi-cylindrical main body extending radially through the link saddle to the main exterior surface.

The HDPE marine boom system may further include a third bolt extending through the third stop passageway of the first piece and the third stop passageway of the second piece.

The at least one marine boom may be a plurality of marine booms disposed on the chain or segments of the chain connected together.

Various aspects will become apparent to those skilled in the art from the following detailed description and the accompanying drawings.

DETAILED DESCRIPTION

Figure 1:
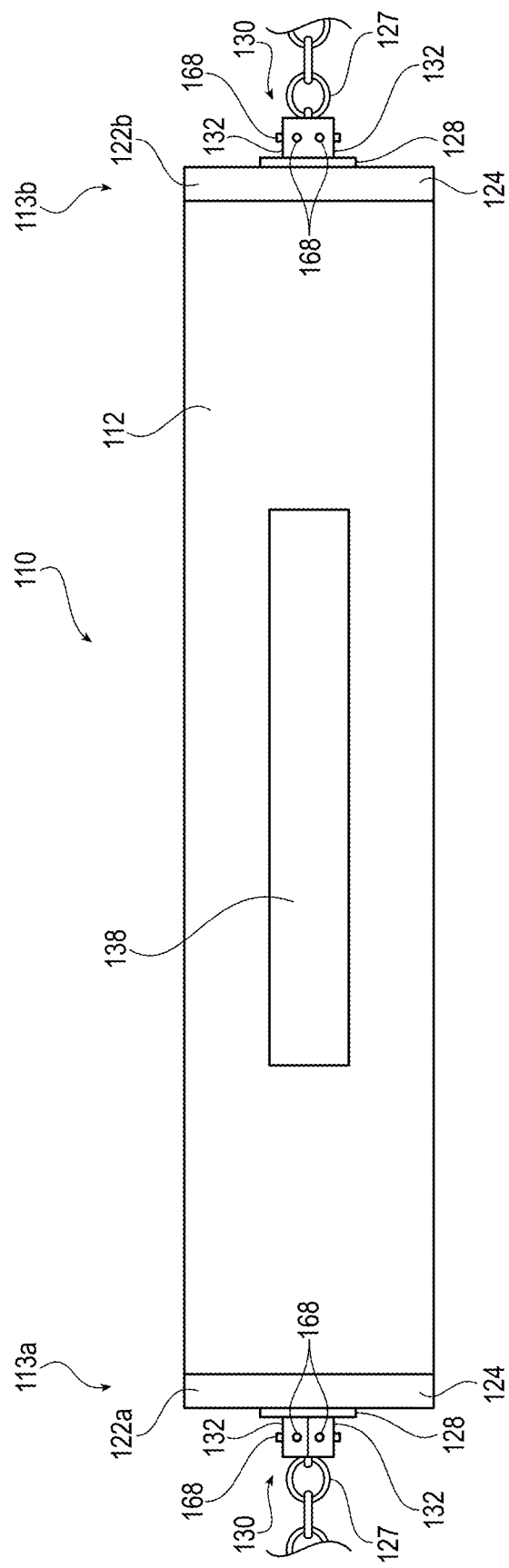
FIG. 1 is a front view of an HDPE marine boom with an axial passageway pipe.
Figure 2:
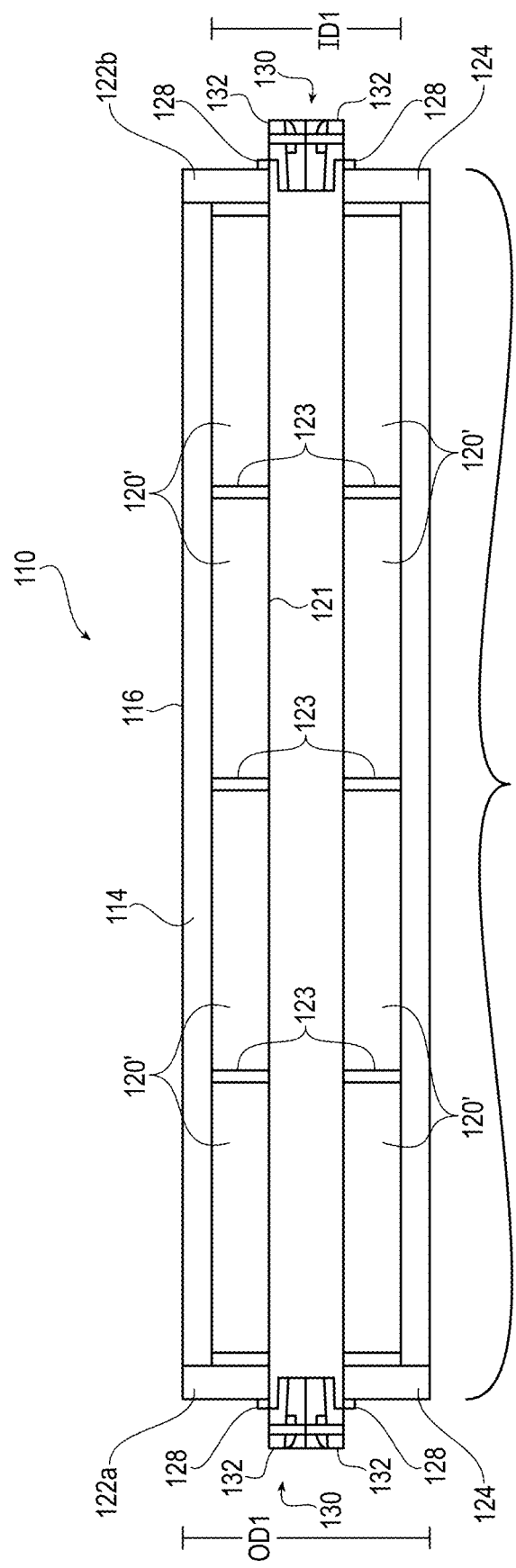
FIG. 2 is a is a longitudinal cross-sectional view of the marine boom of FIG. 1 without the chain.
Figure 3:
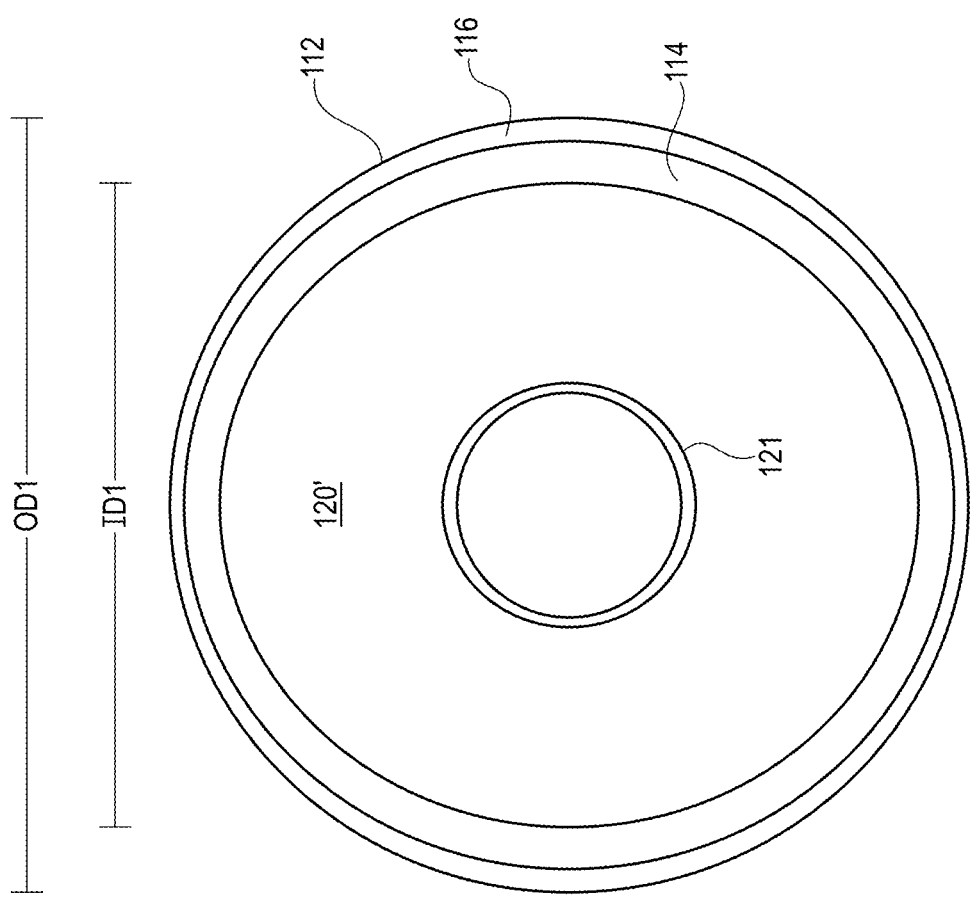
FIG. 3 is a is a lateral cross-sectional view of the shell, and billet of the marine boom of FIG. 1.

There is shown in FIG. 1 a High-Density Polyethylene (HDPE) marine boom 110. The marine boom 110 includes an elongated generally cylindrical shell 112 having first and second ends 113a and 113b. As best shown in FIGS. 2 and 3, the shell 112 has an outer diameter OD1 and an inner diameter ID1. The shell 112 includes an inner layer 114 and an outer layer 116. The inner layer 114 and outer layer 116 are formed from an HDPE with the same formulation, with the inner layer 114 further including at least 2% carbon black by mass and the outer layer 116 not including carbon black, and the outer layer 116 further includes a colorant with ultraviolet stabilizers and antioxidants and the inner layer 114 does not include the colorant. For example, the material for the inner and outer layers 114 and 116 may be ASTM (D3350) HDPE produced according to ASTM D 3350-14 PE 445444 C/E with C refereeing to a 2% minimum carbon black in the inner layer 114 and E referring to the addition of a colorant with UV stabilizer and antioxidants in the outer layer 116. The inner layer 114 and outer layer 116 have been coextruded to form a unitary body for the shell 112. In one preferred embodiment the thickness of the inner layer 114 to the outer layer 116 is in a ratio of approximately 7 to 1. For one example, the inner layer 114 may have a thickness of 28 mm while the outer layer has a thickness of 4 mm. However, it is generally always preferred that that the inner layer 114 is thicker than the outer layer 116. It is noted that the carbon free outer layer 116 is generally translucent, except for the added colorant, and that the inner layer 114 is generally black due to the addition of carbon black. Thus, one factor in the determination of the thickness of the outer layer 116 is the perception of the color desired, as a thinner outer layer 116 would appear darker than a relatively thicker outer layer 116.

The marine boom 110 also includes an optional graphic 138 fusion welded to the outer layer 116. The graphic includes an image formed on a piece of polymer film which has been fused to the shell 112 by flame treating the polymer film and the outer layer 116 until each at least partially liquefies and then allowing the two to cure together.

The shell 112 defines cavity 118. A generally cylindrical floatation billet 120 disposed within the cavity 118 of the shell 112. As will be further described below, an axial passageway pipe 121 is coaxially aligned inside the shell 112 and is disposed within longitudinally extending central opening(s) in the billet 120. In various embodiments, the billet 120 is formed as monolithic body and disposed in the shell 112 as a unitary piece, formed in pieces and joined into a single piece disposed in the cavity 118 of the shell 112, formed as a monolithic body cut into pieces disposed in the cavity as discrete pieces, or formed as separate pieces disposed in the cavity as discrete pieces. As illustrated, the billet 120 includes a number of billet pieces 120'. The billet 120 is preferably made of a foam plastic, polymer, or resin, with a preferred example being expandable polystyrene.

It has been discovered that due to the effects of gravity, the shell 112 of the marine boom 110 generally rests slightly out of round. Further, it has been discovered that the shell 112 being formed from HDPE has a tendency to slightly shrink when in relatively colder environments. This particularly true for the shell 112, which has been coextruded with the outer layer 116 free of carbon black. Thus, in at least one embodiment, it is preferred that the diameter of the billet 120 is less than the inner diameter of the shell 112, particularly preferably at least ⅛th of an inch less.

The marine boom 110 further includes a number of baffle discs 123. The baffle discs 123 extend radially between the axial passageway pipe 121 and an inner surface of the shell 112 and are longitudinally spaced therein. The baffle discs 123 provide structural support between the axial passageway pipe 121 and the shell 112. In one preferred example, the baffle discs 123 are formed from a ridged thermoplastic. In one preferred example, the axial passageway pipe is formed from the same material as the inner layer 114, although such is not required.

In one preferred method of manufacture the baffle discs 123 and billet pieces 120' are placed on the axial passageway pipe 121 individually, either assembled within the shell 112 or assembled and then inserted as an assembly into the shell 112.

Figure 5:
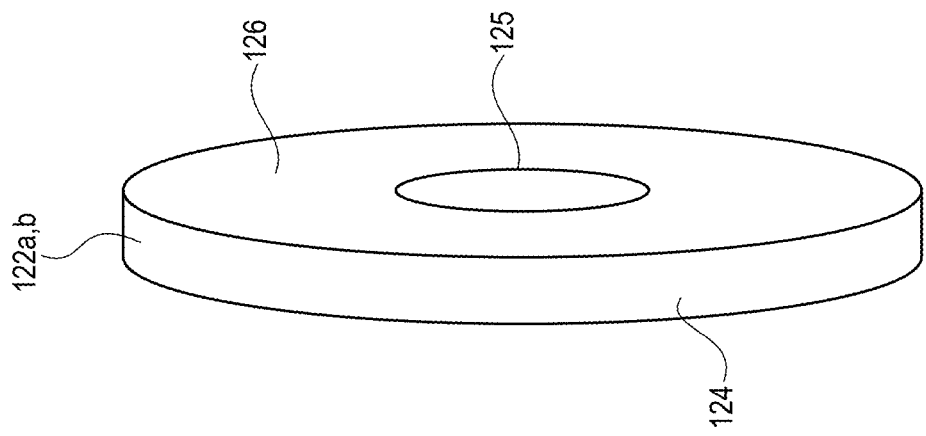
FIG. 5 is an outside end perspective schematic representation of one of the end caps of the marine boom of FIG. 1.
Figure 4:
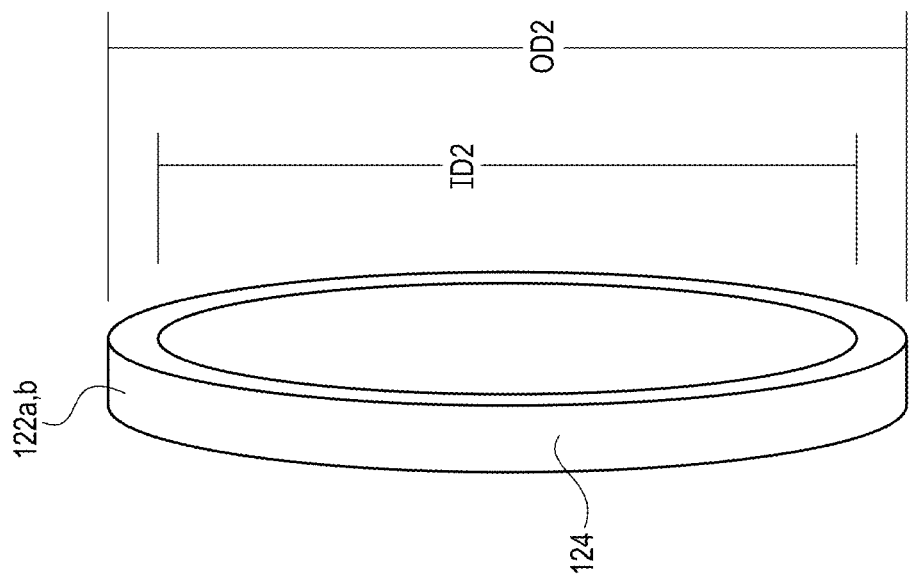
FIG. 4 is a is an inside end perspective schematic representation of one of the end caps of the marine boom of FIG. 1.
Figure 6:
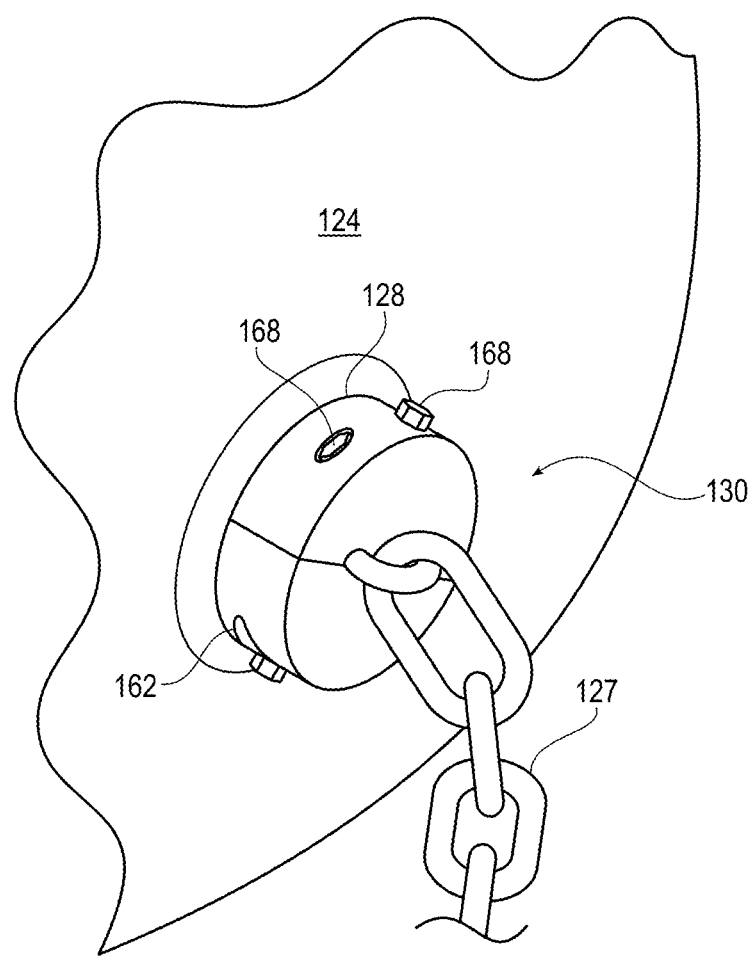
FIG. 6 is a partial perspective end view of the marine boom of FIG. 1.
Figure 7:
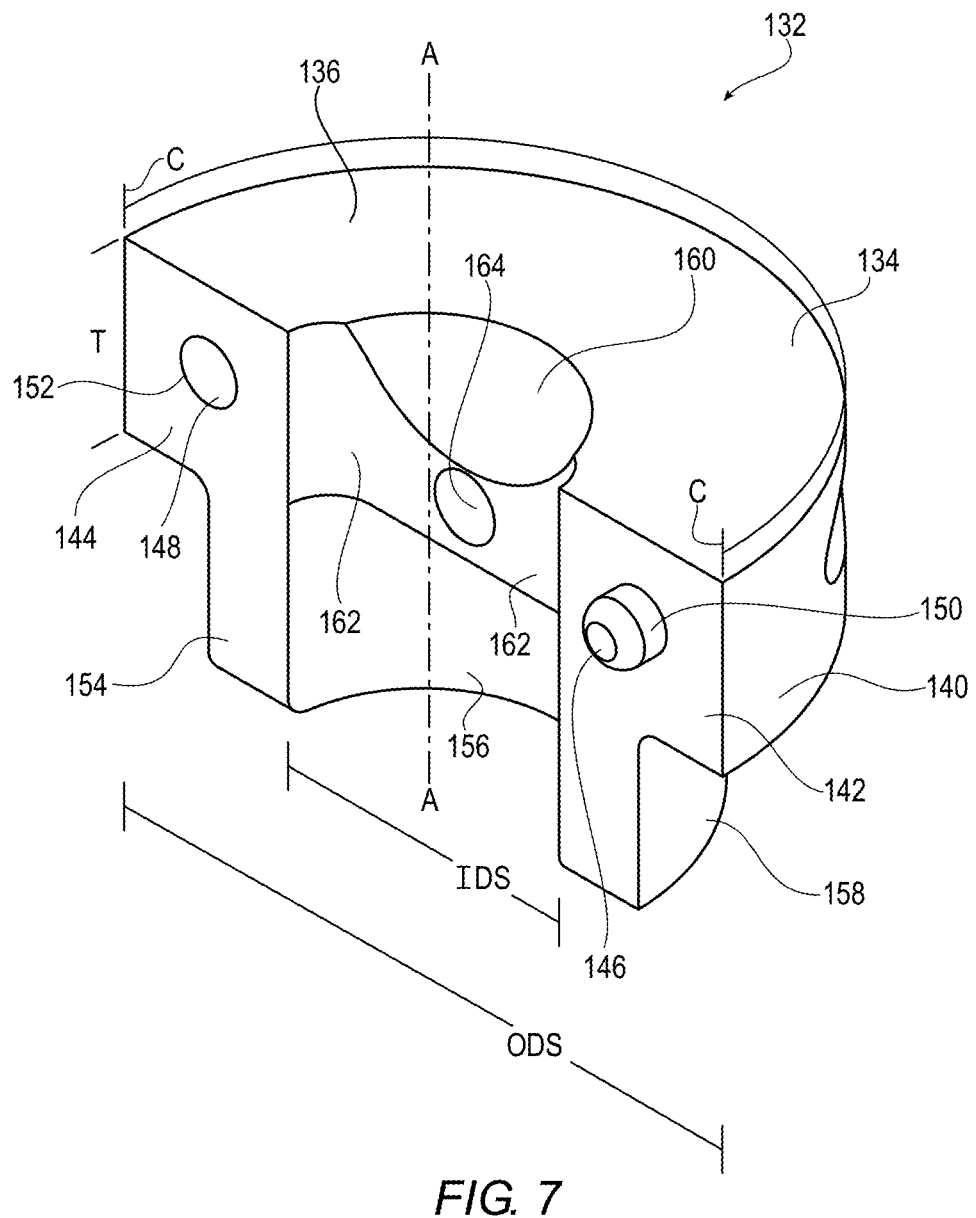
FIG. 7 is a top front perspective view of one assembly piece of the chain stop of the marine boom of FIG. 1.
Figure 8:
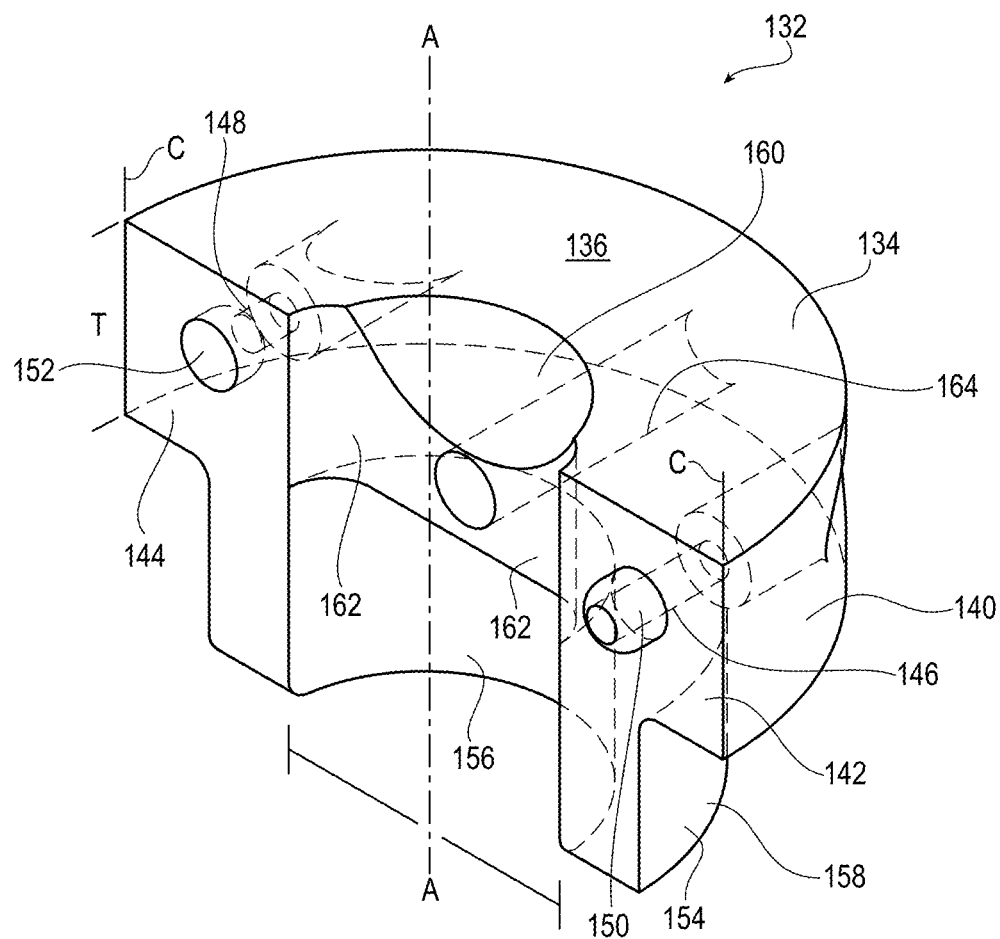
FIG. 8 is a top front perspective schematic view of the assembly piece of FIG. 7.
Figure 9:
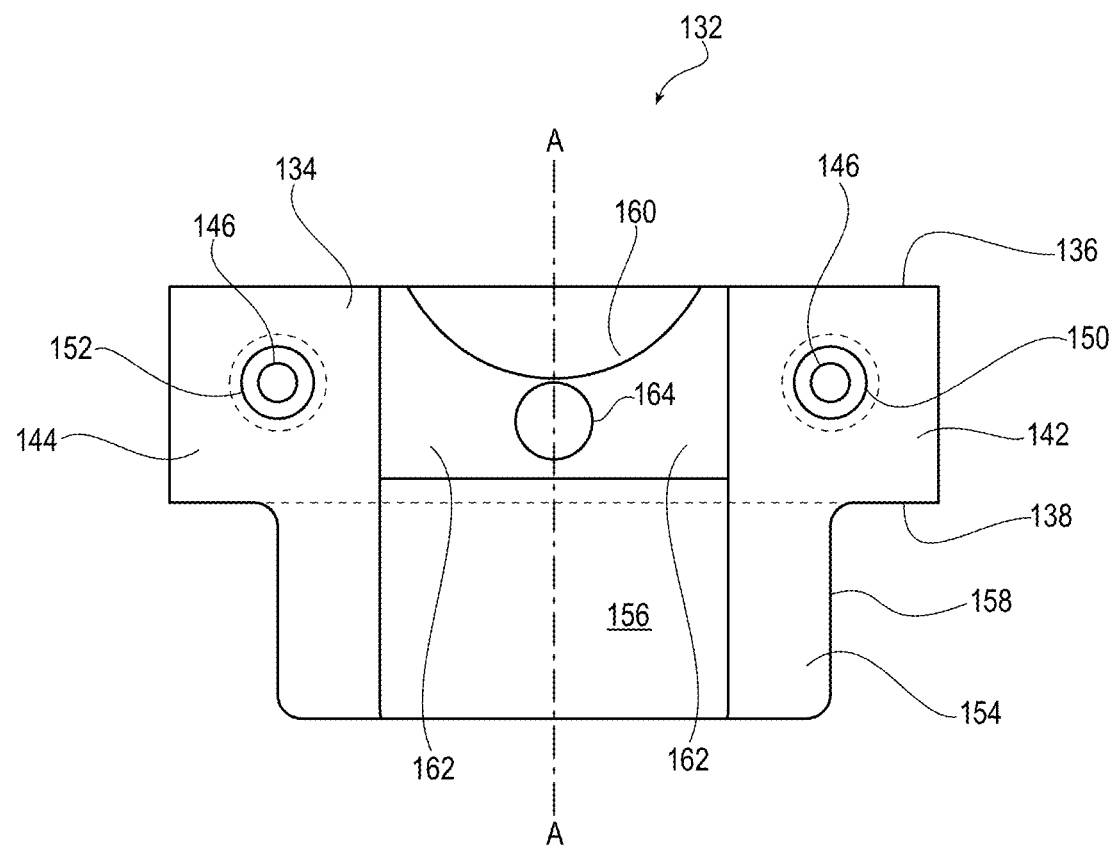
FIG. 9 is a front schematic view of the assembly piece of FIG. 7.
Figure 10:
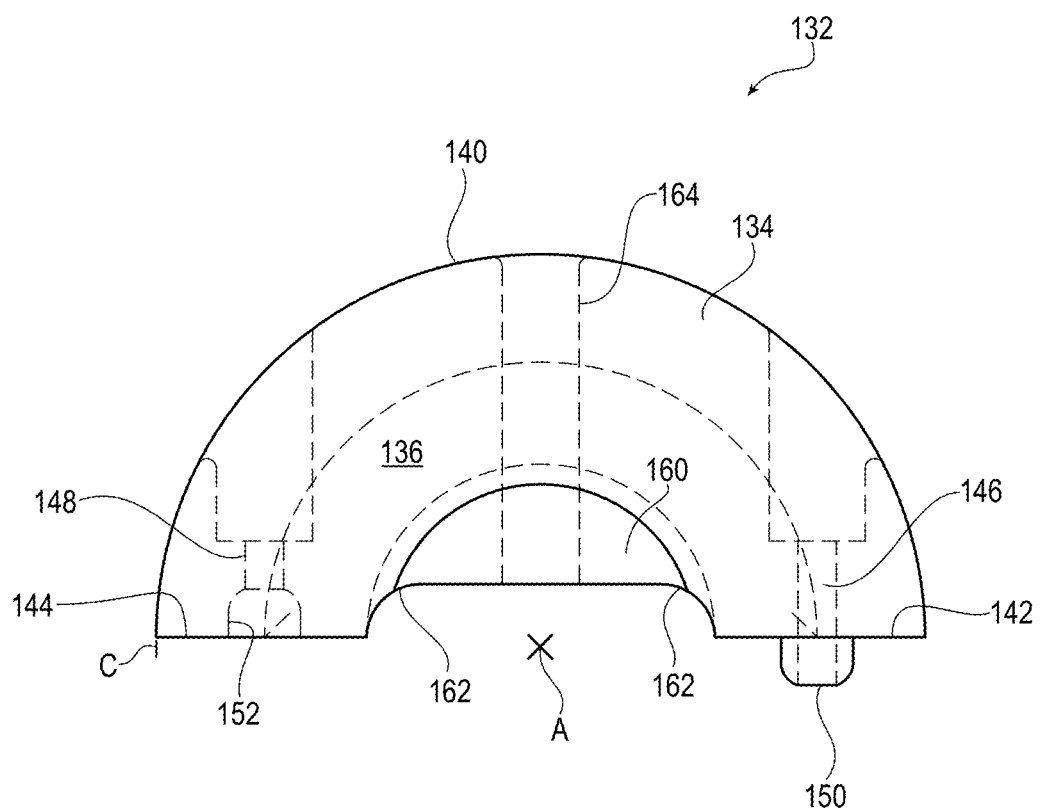
FIG. 10 is a top schematic view of the assembly piece of FIG. 7.
Figure 11:
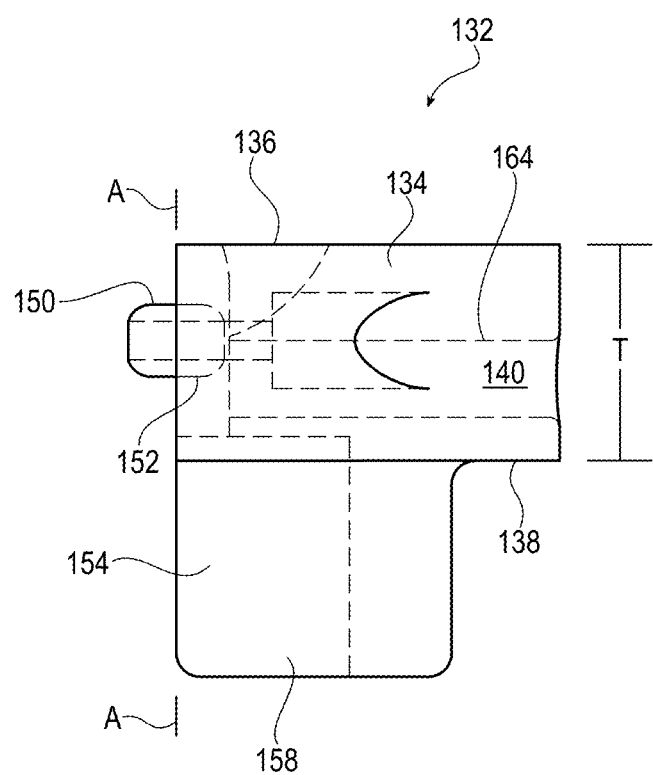
FIG. 11 is a side schematic view of the assembly piece of FIG. 7.

The marine boom 110 includes first and second end caps 122a and 122b, see also FIGS. 4 and 5. The first and second caps 122a and 122b are preferably formed from the same material as the outer layer 116. The first and second end caps 122a and 122b are disposed about the first and second ends 113a and 113b, respectively. Each cap 122a and 122b includes generally cylindrical main body 124 having an outer diameter OD2 and an inner diameter ID2 equal to the outer diameter OD1 and an inner diameter ID1 of the shell. An end wall 126 extends across one end of the main body 124. A cap aperture 125, generally the same diameter as the axial passageway pipe, is formed in the center of the end wall 126, with ends of the axial passageway pipe 121 extending therethrough.

Respective ends of the axial passageway pipe 121 are heat welded to the end walls 126 of the end caps 122*a* and 122*b* about the cap apertures 125 forming weld bead 128. In one preferred method of joining, a wire with weld material is placed around the axial passageway pipe 121 at the cap aperture 125, and the wire, axial passageway pipe 121, and end cap 122*a*, 122*b* are joined about the complete circumference of the axial passageway pipe to form a watertight seal between the axial passageway pipe and the end cap 122*a*, 122*b*.

The other ends of the main bodies 124 of each of the first and second caps 122*a* and 122*b* away from the end wall 126 are axially aligned with the first and second ends 113*a* and 113*b* of the shell 112 respectively and are fusion welded together across the full thickness of the first and second ends 113*a* and 113*b* and around the full circumference of the first and second ends 113*a* and 113*b* forming a watertight seal. In a preferred embodiment the outer circumferential surface of the marine boom 110 at the weld joint of the shell 112 and caps 112*a* and 122*b* is a continuous and even surface with the remainder of the circumferential. For example, a weld bead formed after fusion weld may be removed by chiseling, shaving, or other mechanisms.

The marine boom 110 is mounted on a high strength steel chain 127 that is disposed inside the axial passageway pipe 123. In a preferred embodiment, the chain is a grade 80 dock fender as used in marine application. For example, the chain is preferably in the range of one inch to one-and-one-half inch in diameter/size.

Further, a plurality of marine booms 110 similar booms may be disposed along the chain 127, or sections of chain 127 coupled together, to form a marine boom system.

In one example, the marine boom 110 may be mounted to freely rotate about the chain 127.

In the illustrated example, the marine boom 110 further includes a chain stop 130. The chain stop 130 includes two, preferably identical, assembly pieces 132. As best shown in FIGS. 7-11, each assembly piece 132 includes a semi-cylindrical main body 134 defining a central axis A-A, a main semi-circumference C-C, a main outer diameter ODS, and a main inner diameter IDS. The semi-cylindrical main body has first and second planar ends 136 and 138 spaced apart by a thickness T. A main exterior surface 140 extends about the semi-circumference C-C between the first and second planar ends 136 and 138. The semi-cylindrical main body has first and second interior radial surfaces 142 and 144 extending between the first and second ends 136 and 138 and the inner and outer diameters IDS and ODS. First and second stop passageways 146 and 148 are formed between the main exterior surface 140 and the first and second interior radial surfaces 142 and 144 respectfully. The first and second stop passageways 146 and 148 are co-disposed in a radial plane of the semi-cylindrical main body 134. The semi-cylindrical main body has a protrusion 150 extending from the first radial surface 142 about the first stop passageway 146, and has a recess 152 formed in the second radial surface 144 about the second stop passageway 148. The recess 152 is complementary to the protrusion 150. The protrusion 150 and the recess 152 are spaced an equal radial distance from the axis A.

A semi-cylindrical flange 154 extends coaxially from the second end 138 of the semi-cylindrical main body 134. The semi-cylindrical flange 154 has a flange interior surface 156 coincident with the main inner diameter IDS, and having a flange exterior surface 158 disposed between the main inner diameter IDS and the main outer diameter ODS.

A link saddle 160 extends the semi-cylindrical main body 134 and is disposed across the inner diameter IDS, and defines one or more link beds 162 for receiving portions of a link of chain 127. A third stop passageway 164 is disposed in the link saddle 160 and semi-cylindrical main body 134 extending radially through the link saddle 160 to the main exterior surface 140.

In one preferred embodiment the semi-cylindrical main body 134, the semi-cylindrical flange 154, and the link saddle 160 are monolithically formed. In one preferred embodiment the chain stop 132 is formed from a rigid polymer or plastic, such as Ultra-High-Molecular-Weight (UHMW) Polyethylene.

When the chain stop 130 is assembled with the remainder of the marine boom 110, first and second assembly pieces 132 are placed on either side of a link of chain 127 with the first interior radial surface 142 of the first assembly piece 132 abutting the second interior radial surface 144 of the second assembly piece 132 with the protrusion 150 of the first assembly piece 132 extending into the recess 152 of the second assembly piece 132, and with the second interior radial surface 144 of the first assembly piece 132 abutting the first interior radial surface 142 of the second assembly piece with the protrusion 150 of the second assembly piece 132 extending into the recess 152 of the first assembly piece 132. This is done with the semi-cylindrical flanges 154 of the first and second assembly pieces 132 being disposed within an end of the axial passageway pipe 121, and most preferably with the second planar end 138 abutting the weld bead 128 or end of the axial passageway pipe 121.

The first and second assembly pieces 132 of the chain stop 130 may then be fastened together with a stop fastening arrangement 166, such as a bolt or screws and nut(s). For example, a first bolt may extend through the first stop passageway 146 of the first assembly piece 132 and the second stop passageway 148 of the second assembly piece 132 and secured with a nut, and a second bolt may extend through the second stop passageway 148 of the first assembly piece 132 and the first stop passageway 146 of the second assembly piece 132.

A chain fastener 168, such as a bolt or screw and nut(s) assembly, extends through the third stop passageways 164 of the first and second assembly pieces 132, and through the link of chain 127 disposed there in the chain stop 130, thus securing the marine boom 110 relative to the chain 127.

A marine boom system includes multiple booms 110 disposed upon chain 127 or multiple segments of chain 127 connected together, with one or more of the booms including chain stops 130 to secure those marine booms 110 relative to the chain 127.

While principles and modes of operation have been explained and illustrated with regard to particular embodiments, it must be understood, however, that this may be practiced otherwise than as specifically explained and illustrated without departing from its spirit or scope.

What is claimed is:

1. A High-Density Polyethylene (HDPE) marine boom system comprises:
    at least one marine boom including:
        an elongated generally cylindrical shell defining a cavity, the shell having first and second ends;
        first and second caps disposed about the first and second ends respectively, each cap including a generally cylindrical main body having an outer diameter and an inner diameter equal to an outer diameter and an inner diameter of the shell, and an end wall extending across one end of the main body including a centrally located circular aperture, where the other end of the main body of each of the first and second caps are axially aligned with the first and second ends of shell respectively and joined together forming a watertight seal;

an axial passageway pipe having a generally cylindrical main body disposed longitudinally along and aligned with a center axis of the shell, and having first and second ends extending beyond the first and second ends of the shell respectively and through the circular apertures in the end walls of the first and second caps and beyond an end face of the end walls, where respective ends of the axial passageway pipe are welded to respective end walls of each of the first and second caps at an interface of an outer circumference of the axial passageway pipe main body and the apertures in the end wall of the first and second caps and forming a watertight seal; and a floatation billet disposed within the cavity in the shell, where the flotation billet is coaxially disposed between axial passageway pipe and the shell; and a chain consisting of a plurality of chain links disposed in the axial passageway pipe and extending beyond the ends of the axial passageway pipe;

where the shell includes an inner layer and an outer layer, where the inner layer and outer layer are formed from HDPE with the same formulation, with the inner layer further including at least 2% carbon black by mass and the outer layer does not include carbon black and the outer layer further including a colorant with ultraviolet stabilizers and the inner layer does not include the colorant, where the inner layer and outer layer have been coextruded to form a unitary body.

2. The HDPE marine boom system of claim 1 where the marine boom further includes at least one baffle disc extending radially between the axial passageway pipe and an inner surface of the shell and are longitudinally spaced therein, to provide structural support between the axial passageway pipe and the shell.

3. The HDPE marine boom system of claim 2 where the baffle disc is formed from a ridged thermoplastic.

4. The HDPE marine boom system of claim 2 where the billet includes at least two billet pieces placed on the axial passageway pipe and disposed on opposite sides of the baffle disc.

5. The HDPE marine boom system of claim 1 where respective ends of the axial passageway pipe are heat welded to the end walls of the end caps about the cap apertures forming weld bead.

6. The marine boom of claim 1 further comprising a graphic formed on a piece of polymer film and fuses to the shell by flame treating the polymer film and the outer layer of the shell until each at least partially liquifies and then allowing the two to cure together.

7. The HDPE marine boom system of claim 1 where the end caps formed from the same material as the outer layer and where the axial passageway pipe is formed from the same material as the inner layer.

8. The HDPE marine boom system of claim 7 where respective ends of the axial passageway pipe are heat welded to the end walls of the end caps about the cap apertures forming weld bead.

9. The HDPE marine boom system of claim 1 where the at least one marine boom is a plurality of marine booms disposed on the chain or segments of the chain connected together.

10. A High-Density Polyethylene (HDPE) marine boom system comprises:

at least one marine boom including:
an elongated generally cylindrical shell defining a cavity, the shell having first and second ends;
first and second caps disposed about the first and second ends respectively, each cap including a generally cylindrical main body having an outer diameter and an inner diameter equal to an outer diameter and an inner diameter of the shell, and an end wall extending across one end of the main body including a centrally located circular aperture, where the other end of the main body of each of the first and second caps are axially aligned with the first and second ends of shell respectively and joined together forming a watertight seal;
an axial passageway pipe having a generally cylindrical main body disposed longitudinally along and aligned with a center axis of the shell, and having first and second ends extending beyond the first and second ends of the shell respectively and through the circular apertures in the end walls of the first and second caps and beyond an end face of the end walls, where respective ends of the axial passageway pipe are welded to respective end walls of each of the first and second caps at an interface of an outer circumference of the axial passageway pipe main body and the apertures in the end wall of the first and second caps and forming a watertight seal; and
a floatation billet disposed within the cavity in the shell, where the flotation billet is coaxially disposed between axial passageway pipe and the shell;

a chain consisting of a plurality of chain links disposed in the axial passageway pipe and extending beyond the ends of the axial passageway pipe; and a chain stop including first and second assembly pieces, each having:
at least one semi-cylindrical main body defining a central axis, a main semi-circumference, a main outer diameter, and a main inner diameter, having first and second planar ends spaced apart by a thickness, having a main exterior surface extending about the semi-circumference between the first and second planar ends, having first and second interior radial surfaces extending between the first and second planar ends and the main inner and main outer diameter, where first and second stop passageways are formed between the main exterior surface and the first and second interior radial surfaces respectfully, the first and second stop passageways being co-disposed in a radial plane of the semi-cylindrical main body, and the main body having a protrusion extending from the first radial surface about the first stop passageway, and having a recess formed in the second radial surface about the second stop passageway complementary to the protrusion; the protrusion and the recess spaced an equal radial distance from the axis;
a semi-cylindrical flange extending coaxially from the second end of the semi-cylindrical main body, the semi-cylindrical flange having a flange interior surface coincident with the main inner diameter, and having a flange exterior surface disposed between the main inner diameter and the main outer diameter; and a link saddle extending from the main body, disposed across the inner diameter, and defining link beds for receiving portions of a link of chain;

where the semi-cylindrical flanges of the first and second chain stops are disposed in respective ends of the axial passageway pipe, each having one of the plurality of chain links disposed within the assembly in the semi-cylindrical flange and between the link saddles of the first and second piece.

11. The HDPE marine boom system of claim 10 where the semi-cylindrical main body, the semi-cylindrical flange, and the link saddle, of each of the first and second assembly pieces, are monolithically formed.

12. The HDPE marine boom system of claim 10 further comprising a first bolt extending through the first stop passageway of the first assembly piece and the second stop passageway of the second assembly piece, and a second bolt extending through the second stop passageway of the first assembly piece and the first stop passageway of the second assembly piece, and securing the first and second assembly pieces together.

13. The HDPE marine boom system of claim 12 where the first and second assembly pieces each include a third stop passageway disposed in the link saddle and the semi-cylindrical main body extending radially through the link saddle to the main exterior surface.

14. The HDPE marine boom system of claim 13 further comprising a third bolt extending through the third stop passageway of the first piece and the third stop passageway of the second piece.

* * * * *